Feb. 6, 1968 H. J. LIPPMANN ET AL 3,368,208

INFORMATION CARRIERS FOR MAGNETIC DESTINATION RECORDING IN CONVEYING SYSTEMS

Filed Jan. 30, 1964 2 Sheets-Sheet 1

Feb. 6, 1968 H. J. LIPPMANN ET AL 3,368,208

INFORMATION CARRIERS FOR MAGNETIC DESTINATION RECORDING IN CONVEYING SYSTEMS

Filed Jan. 30, 1964 2 Sheets-Sheet 2

United States Patent Office 3,368,208 Patented Feb. 6, 1968

3,368,208

INFORMATION CARRIERS FOR MAGNETIC DESTINATION RECORDING IN CONVEYING SYSTEMS

Hans Joachim Lippmann and Klemens Wiehl, Nuremberg, Germany, assignors to Siemens-Schuckertwerke Aktiengesellschaft, Berlin-Siemensstadt, Germany, a corporation of Germany Filed Jan. 30, 1964, Ser. No. 341,360
Claims priority, application Germany, Jan. 30, 1963, S 83,492
1 Claim. (Cl. 340—174.1)

ABSTRACT OF THE DISCLOSURE

A magnetizable destination marker on each unit in a system for the selective distribution of travelling conveying units comprises a rigid non-magnetic support and a foil of magnetizable material on the non-magnetic support for recording information indicating the destination of the corresponding conveying unit. The foil has a thickness of about 0.5 mm. and a coercive force of 25 to 35 oersteds and a remanence induction of at least 10,000 gauss.

Our invention relates to information signal carriers for magnetically retaining a coded destination in conveying and distributing systems, particularly where the signal carriers actuate proximity switches.

In such systems individual conveyance units to be conveyed to desired destinations on a travel path network, possess signal carriers which retain coded magnetic signals that have been entered by electromagnetic recording heads for identifying the destination. During travel, magnetic sensors in the path scan the signals and actuate switches or other direction-changing equipment in the travel path so as to direct the units to the coded destination.

Magnetic sensors with Hall generators are particularly suitable as read-out heads. This is so because Hall generators respond to the absolute value of the magnetic signal regardless of the conveyance unit travelling speed, thus permitting signal read-out when the unit is motionless. Recording and reading of the destination-identifying signals is simple if the recording heads and read-out heads can be kept close to the magnetized information carrier or storer. Where record destination signals can be entered into the information carrier during standstill of the conveyance unit and with the recording head directly contacting the signal carrier, strong signals are recorded, and the signal carrier material can have a high coercive force in the order of several hundred oersteds. As a result, the active effective spatial operating range of the coded signals is great enough to permit the read-out heads to be mounted at a relatively large distance from the travel path of the information signal carrier.

Frequently, however, it is essential that the information signals be encoded as well as read-out while the conveyance unit moves. Then contact between the transducer heads and information signal carrier is no longer possible. Furthermore, since the mechanical guidance of conveyance units is rather coarse and inaccurate, the space between the information signal carrier on the unit being conveyed and the encoding head or read-out head will vary within a wide range, such as between 5 and 15 mm. These circumstances create difficulties because it is necessary now to enter destination signals and also scan these recorded signals, across relatively large distances. In such cases, the materials usually employed for the information carriers, having coercive forces of a few hundred oersteds, are unsuitable.

It is an object of our invention to overcome these difficulties and to permit reliable recording, as well as reliable read-out, of destination-identifying marker signals in conveying systems where there exist neither a direct contact nor a constant clearance between the information carrier and the respective recording and reading transducers.

The invention will be further described with reference to the accompanying drawings in which:

FIG. 1*a* schematically shows a magnetic destination marker or storer in conjunction with a conveyance unit of the suspended type, FIG. 1*b* schematically shows three recording heads, and FIG. 1*c* schematically shows three reader heads for cooperation with the marker of FIG. 1*a*.

FIG. 2 schematically shows a horizontal section through an information carrier according to FIG. 1*a*, conjointly with one of the recording heads according to FIG. 1*b*.

Figures 1A, 1B, 1C, 2, 3, 4:
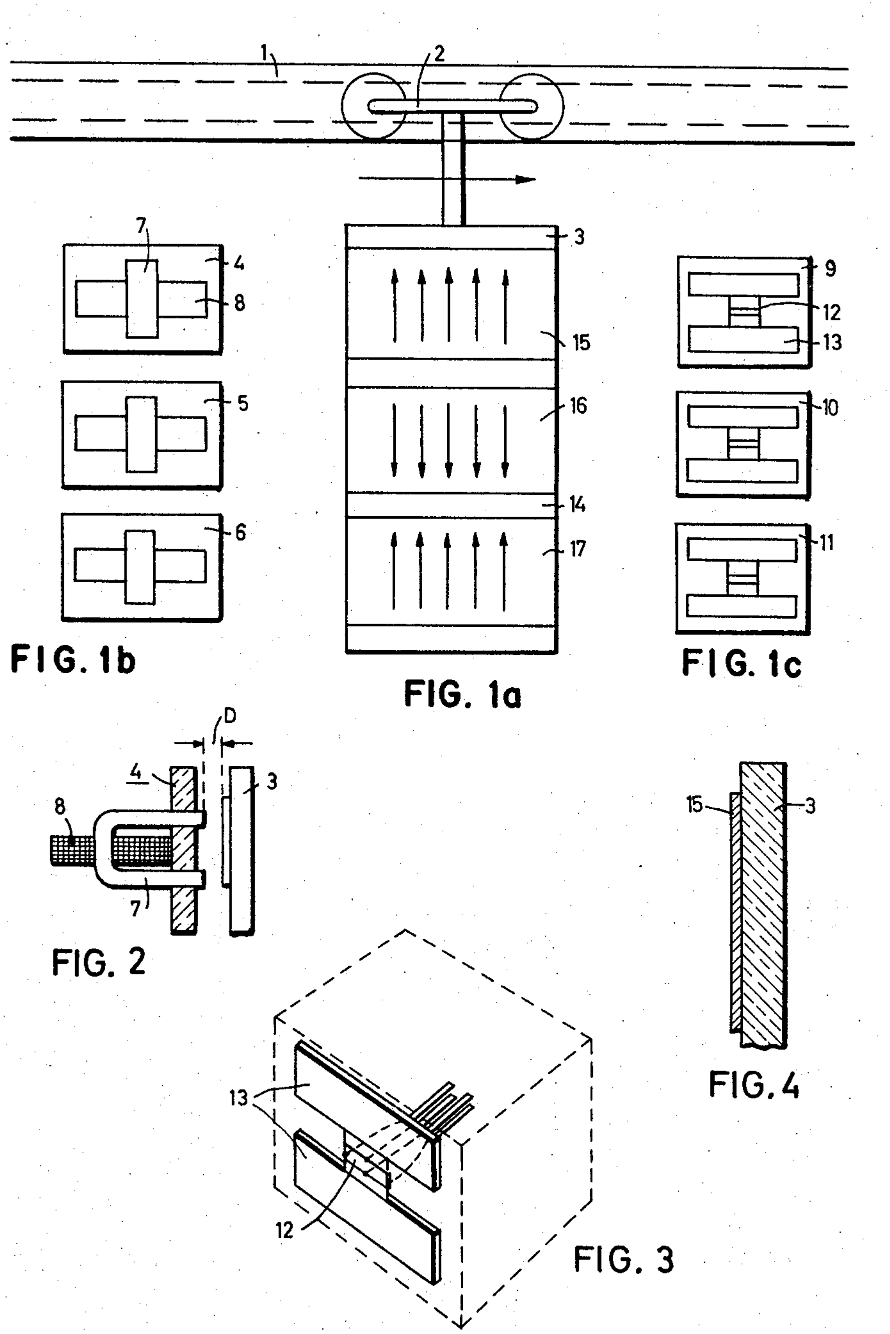
FIG. 3 is a perspective drawing of one of the reader heads according to FIG. 1*c*.
FIG. 4 is a cross section of the information carrier according to FIG. 1*a*.

The conveyor system according to FIG. 1*a* comprises a rail 1 with a number of rail switches (not shown) for directing a number of conveying units to respectively different destinations. Each conveying unit comprises a carriage 2 whose running wheels travel on the rail 1 and from which the conveying unit proper is suspended. Each unit is provided with an information carrier. FIG. 1*a* represents the conveying unit only by its information carrier 3, although it will be understood that the information carrier constitutes only a small addition to the much larger unit proper. The information carrier includes three signal tracks or storers. For impressing respective magnetic signals upon these tracks, the system is provided with a recording station at a dispatch position. The station is equipped with three recording heads 4, 5 and 6, each comprising a U-shaped magnet core 7 and an excitation coil 8 (FIGS. 1*b* and 2). As the information carrier on the travelling conveyor unit passes by the recording station (FIG. 2) the magnets are energized to impress respective signals upon the three magnetizable tracks of the information carrier. That is, each track receives either a positively or negatively polarized magnetization, this being exemplified in FIG. 1*a* by upwardly directed arrows in track 15 and in track 17 and by downwardly directed arrows in track 16. Depending upon the combination of positive and negative signals thus recorded on the information carrier, the entire three-bit signal represents the coded destination of the conveying unit. It will be understood that, while only three signal tracks and recording heads are shown, the number of tracks can be increased to accommodate any desired larger number of coded identifications.

As the conveying unit with its information carrier 3 passes by a read-out location, the information carrier 3 approaches a reader station which, according to FIG. 1*c* is equipped with three reader heads 9, 10 and 11, each containing a Hall generator 12 and magnetizable field plates 13 consisting of sheet metal of ferrite (FIG. 3). The three Hall generators, as the information carrier passes by, generate corresponding voltages which, in combination, identify the destination of the conveyor and are employed for performing the necessary control action, for example setting a rail switch, if this is needed for passing the conveying unit to the intended destination.

As is apparent from the drawing, the magnetization of the information carrier is in the transverse direction; that is the direction of the magnetization impressed upon the information carrier 3 is perpendicular to its direction of travel.

As mentioned, the suspended conveyor unit passes by the recording heads 4, 5 and 6 by being somewhat spaced therefrom, the distance being non-uniform and amounting to between 5 and 15 mm. due to inaccuracies in the guidance of the conveyor carriage or the position of the suspended conveyor unit. Similar inaccuracies apply also to the scanning of the recorded signals. That is, the action range of the magnetically recorded destination markers must be at least 5 to 15 mm. and at this distance must still furnish a Hall-voltage signal of sufficient magnitude, preferably a Hall voltage of more than 100 mv.

We have discovered and have ascertained by comprehensive investigation that, contrary to past knowledge and expectation, a magnet material of relatively low coercive force employed as information carrier, rather than a material of high coercive force, heretofore considered preferable, satisfies the just-mentioned requirements. More specifically, according to our invention, the information carrier in a system of the type described comprises, attached upon a non-magnetic support, a foil of magnet material having a coercive force of about 25 to 35 oersteds and a high remanence induction of at least 10,000 gauss, the foil preferably having a thickness of about 0.5 mm.

This extremely low coercive force for a material used as a magnetic information carrier permits the magnetic recordings to be impressed over relatively large distances, and also provides sufficient operating distances for scanning the signals with the reading transducers. The recording heads require in the order of 1000 ampere turns. A distance of about 40 mm. between the signal tracks and the carrier then prevents the occurrence of spurious signals and cross talk between the individual code bits.

It had been expected that the use of magnetic materials having high coercive forces would result in correspondingly greater operating ranges for scanning the impressed signals by the read-out heads and hence would result in a correspondingly higher Hall voltage. We have found, however, that in reality only very low Hall voltages are obtained by increased coercive forces because the effort and material required for reducing the recordings, as well as the necessity of avoiding disturbing cross magnetization on undesired tracks, does not actually permit applying high magnetizations when impressing the information upon the carrier. Consequently, although a material of high coercive force is suitable in destination marking devices where the information can be impressed at standstill, it cannot be utilized when the signal impression must be effected during continuous travel of the conveying unit and with varying spacing between the information carrier and the transducer heads. Thus, the theoretically-expected increase in the operating range of a signal impressed upon a carrier material of high coercive force cannot be utilized for such purposes as those here dealt with.

This will be further explained with reference to test results. A commercially available cold-rolled material composed of 55% cobalt, 7% chromium, 3% vanadium and 38% iron, having a coercive force of 150 to 200 oersteds was used. An information carrier equipped with a magnetizable foil of this material and 0.4 mm. foil thickness resulted in a Hall voltage of about 70 to 80 mv. Under the same test conditions but with the foil thickness increased to 0.6 mm., the Hall voltage was only 10 to 25 mv. due to the higher de-magnetizing factor.

The same material, with a foil thickness of 0.4 mm. was heated for about 2 hours at 400 to 450° C., thus reducing the coercive force to a value below 40 oersteds. Now, under the same test conditions, a Hall voltage of about 100 mv. was measured.

Still better results were obtained with a different material, also commercially obtainable, which is composed of 30% cobalt, 15% chromium and 55% iron. After heat treatment at 400 to 500° C. for about 2 hours, the material has a coercive force between 25 and 35 oersteds and a remanence induction at 17,000 to 18,000 gauss. With foils of 0.4 mm. thickness, Hall voltages of 110 to 175 mv. were measured. Foils of 0.6 mm. thickness resulted in Hall voltages of 160 to 190 mv. In general, it has been found useful to employ foils of 0.5 mm. thickness having a coercive force of about 30 oersteds at the highest possible remanence induction.

An individual strip-shaped foil 15, 16, 17 can be used for each individual signal track, or all tracks can be accommodated on a single foil. As an example for the dimensions of the information storer, it may be mentioned that in an embodiment satisfactorily employed in practice, the foils for individual tracks had a size of 60 x 40 mm., and for three tracks a size of 60 x 170 mm. In both cases the distance between the track center lines was 40 mm.

FIG. 3 shows one of the Hall generators 12 with its four leads, two serving for passing control current through the semiconductor plate, and two for providing the Hall voltage. As shown by a broken line, the Hall generator may be inserted into a housing for shielding purposes.

The magnet foil is cemented onto the insulating body of the information carrier 3 as is best apparent from FIG. 4. The carrier body may consist of synthetic plastic or ceramic material.

Relative to the control of the recording heads for impressing the destination-identifying signals upon the information carrier, and the utilization of the signals read-out by the Hall generators, reference may be had to the copending application Ser. No. 249,515, filed Jan. 4, 1963, and issued May 2, 1967 as United States Patent No. 3,317,714, and the application of Kuhrt et al., Ser. No. 333,840, filed on or about Dec. 27, 1963, entitled, "Apparatus for Destination Control of a Conveyance by Means of Hall Generators," and issued Dec. 14, 1965, as U.S. Patent No. 3,223,353, both assigned to the assignee of this application.

Figure 5:
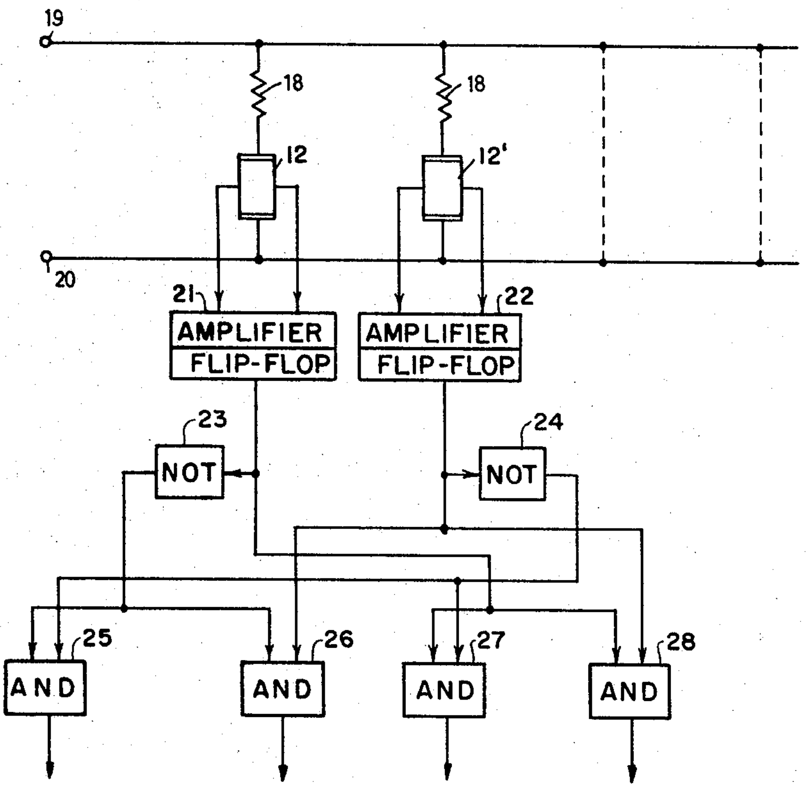
FIG. 5 is a schematic circuit diagram of a reader-head assembly according to FIG. 1*c*.

However, a preferred way of applying the voltage signals furnished from the Hall generators of the reader heads is illustrated in FIG. 5, showing only two Hall generators. The provision of three or more Hall generators results in an analogous enlargement of the same circuitry.

The Hall generators 12 and 12' of the reader heads 9 and 10 are energized through series resistors 18 from terminals 19 and 20 with direct current of constant voltage. The Hall voltages are supplied to respective impedance matching amplifiers 21 and 22 which include respective flip-flop stages so as to furnish an output signal only when the Hall generators furnish a Hall voltage of a given polarity. Connected to the two amplifiers 21 and 22, directly on the one hand, and through NOT gates (reversing stages) 23 and 24 on the other hand, are a total of four AND gates 25, 26, 27 and 28 which actuate corresponding control devices (not shown). Depending upon the coded signal impressed upon the information carrier, only one of the AND gates will issue a control signal.

The information carrier according to the invention is suitable for all conveying, transporting and distributing devices, regardless of in which particular manner the units are guided and advanced, whenever inaccuracies are to be encountered with respect to the travel path so that the distance between information carrier and the transducer heads may vary. This applies also to belt-conveyor systems and pneumatic tube conveyors and the like.

We claim:

1. A system for selective distribution of travelling conveying units having magnetizable destination markers on the respective units, comprising magnetizing recorder means for transversely magnetizing said markers by a destination-determining code group of magnetic signals and signal reader means having respective Hall generator means responsive to said signals, said recording means and said reader means being stationary at respective localities spaced from each other along a travel path of said markers on said conveying units and being operative with respect to said markers as said markers are travelling by said localities, the closest spacing between each of said markers and each of said recording means and reader means being 5 to 15 mm., each of said markers having a rigid non-magnetic support member forming a surface facing said localities when near and at said closest spacing, and each of said markers having a foil of about 0.5 mm. thickness attached to said surface in face-to-face relation thereto and consisting of magnetic material having a coercive force of 25 to 35 oersteds and a remanence induction of at least 10,000 gauss.

References Cited

UNITED STATES PATENTS

| | | | |
|---|---|---|---|
| 2,981,830 | 4/1961 | Davis et al. | 340—174.1 X |
| 3,168,268 | 2/1965 | Bossart et al. | 235—61.114 |
| 3,215,820 | 11/1965 | Heard | 235—61.114 |
| 2,558,104 | 6/1951 | Scharshu | 274—41.4 |
| 2,783,170 | 4/1956 | Littman | 274—41.4 |
| 2,875,429 | 2/1959 | Quade | 179—100.2 |

FOREIGN PATENTS

| | | |
|---|---|---|
| 489,261 | 6/1938 | Great Britain. |
| 916,987 | 1/1963 | Great Britain. |
| 1,328,708 | 7/1962 | France. |

OTHER REFERENCES

"Unlabeled Food Cans," Electronics magazine, September 1952 (Vol. 25, issue #9), pages 101 through 105.

TERRELL W. FEARS, *Primary Examiner.*

BERNARD KONICK, *Examiner.*

V. P. CANNEY, *Assistant Examiner.*